Feb. 24, 1942.            F. W. LUTZ ET AL            2,273,876
APPARATUS FOR INDICATING TILT OF CAMERAS
Original Filed Jan. 8, 1938        2 Sheets-Sheet 1
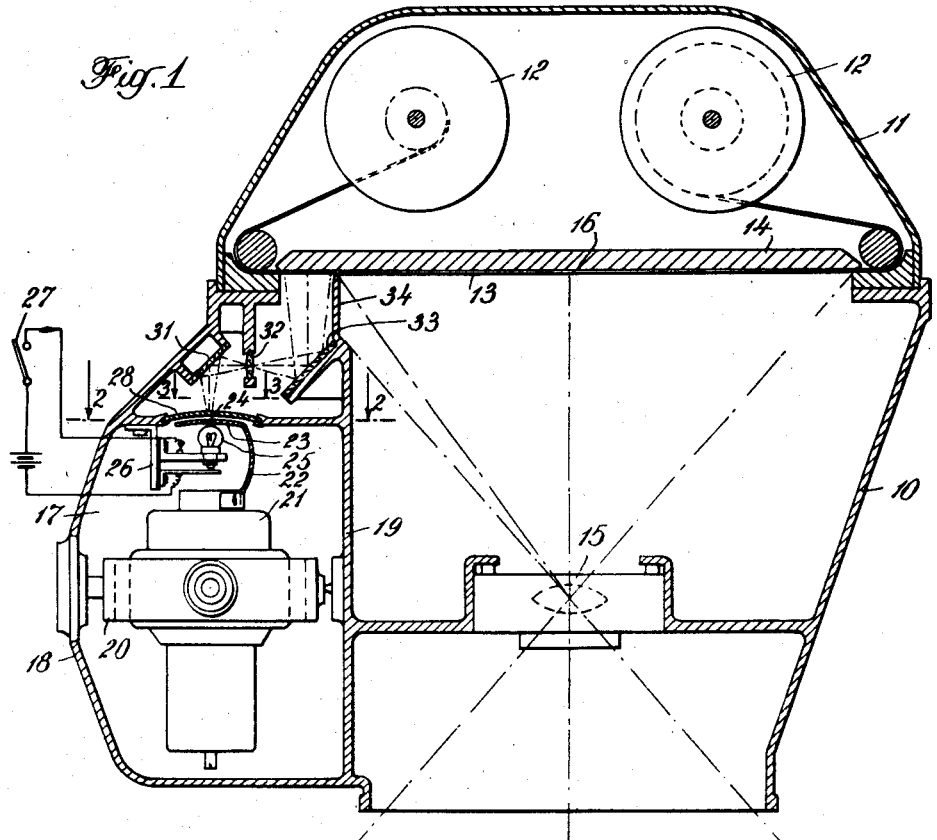
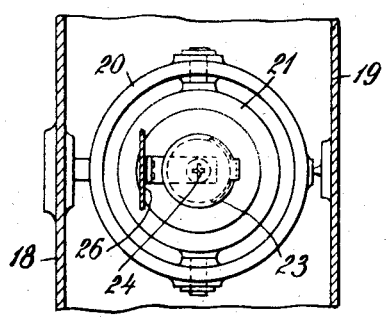
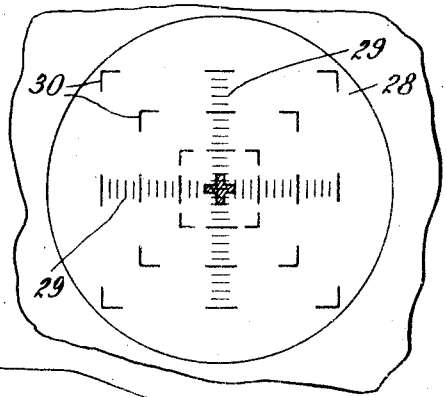
INVENTORS
Frederick W. Lutz
John D. Peace, Jr.
BY
Blair, Curtis, Dunne & Hayward
ATTORNEYS Feb. 24, 1942.   F. W. LUTZ ET AL   2,273,876
APPARATUS FOR INDICATING TILT OF CAMERAS
Original Filed Jan. 8, 1938   2 Sheets-Sheet 2
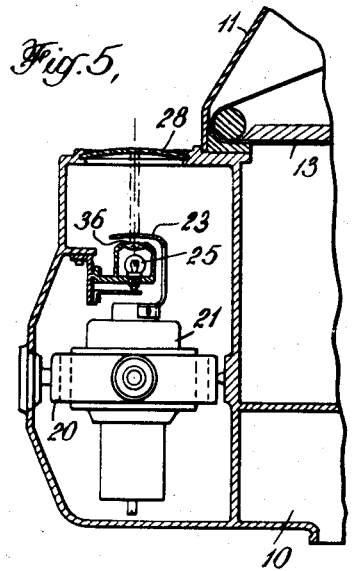
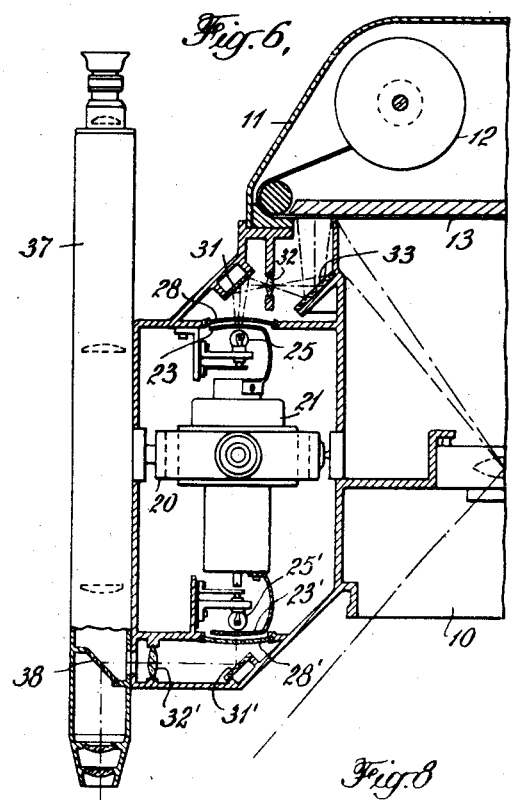
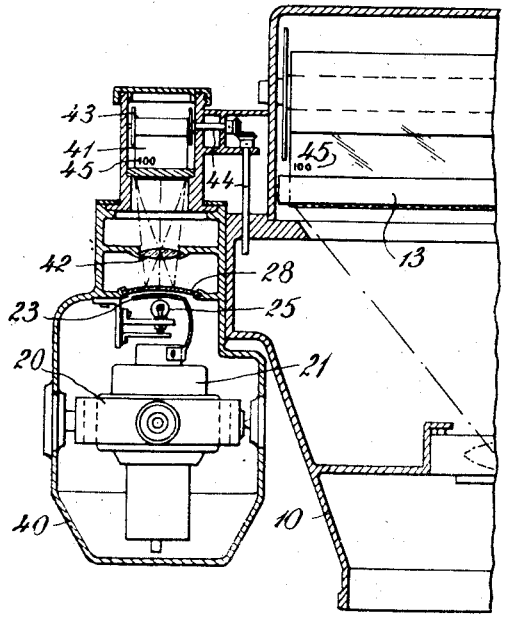
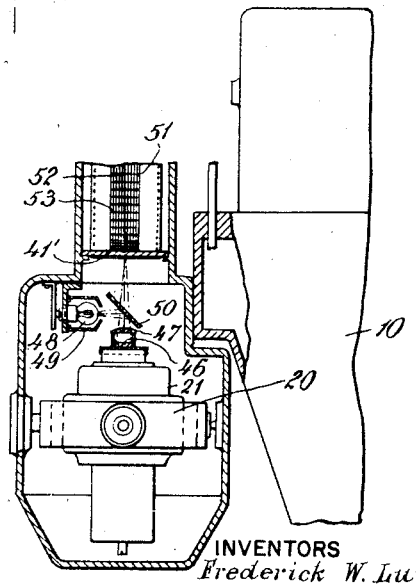
INVENTORS
Frederick W. Lutz
John D. Peace, Jr.
BY
ATTORNEYS Patented Feb. 24, 1942

2,273,876

UNITED STATES PATENT OFFICE 2,273,876

APPARATUS FOR INDICATING TILT OF CAMERAS

Frederick W. Lutz, Garden City, and John D. Peace, Jr., Flushing, N. Y.

Continuation of application Serial No. 183,976, January 8, 1938. This application February 12, 1940, Serial No. 318,424

4 Claims. (Cl. 95—1.1)

This invention relates to aerial cameras and has particular reference to means for indicating, or registering on the camera film, or on an associated record, the relative tilt of the camera at the time an exposure was made.

In accordance with the present invention a gravity stabilized light projection means is associated with a camera or other observation instrument, and with a graduated scale fixed or otherwise connected to the camera for indicating on the scale the relative tilt of the camera or other instrument with respect to the stabilized means.

In a preferred embodiment of the invention for use with a camera, the light projected by the means is preferably photographically registered with an image of the associated scale on the film for providing on the picture a record of the relative tilt of the camera at the time of exposure. For use with any instrument, an auxiliary film may be utilized to record photographically the relative tilt of the instrument at the time of any particular reading or observation. Also, the new tilt indicating and tilt recording means may be operated simultaneously, and other modifications of the tilt indicating or recording means may be provided in accordance with various requirements.

For a more complete understanding of the invention, reference may be had to the accompanying drawings, in which, Figure 1 is a vertical section through a more or less conventional form of aerial camera fitted with one form of the tilt recording apparatus of this invention;

Figure 2 is an enlarged horizontal section therethrough, as seen along the line 2—2 of Figure 1;

Figure 3 is an enlarged view of the tilt indicating scale as seen along the line 3—3 of Figure 1;

Figure 4 is a portion of a developed negative having photographed thereon the tilt record;

Figure 5 is a fragmentary vertical section of a modification illustrating the tilt indicating apparatus mounted on a camera or other instrument for direct observation of the degree of tilt thereof;

Figure 6 is a fragmentary vertical section through a camera having a view finder and equipped with the tilt indicating apparatus, the indication of which is both photographed by the camera and directly observed in the view finder;

Figure 7 is a fragmentary vertical section through a modification in which a separate tilt recording apparatus with its separate film is auxiliary to the main camera or other instrument; and, Figure 8 illustrates another modification in which a spot of light records on a graduated film the relative tilt of the instrument.

This application is a continuation of our co-pending application, Serial No. 183,976, filed January 8, 1938, entitled "Apparatus for indicating tilt of camera."

Referring to Figure 1 of the drawings, numeral 10 designates the housing of an aerial camera of the Fairchild type, for example, which is suitably mounted in the usual way on a universal support, not shown, for maintenance of a normal vertical position on an aeroplane or other aerial craft, and which is fitted with a removable film magazine 11 having the reels 12 between which the film 13 is moved over a pressure plate 14, so that the film lies in the focal plane of the camera lens 15. Upon exposure the image of the selected subject, such as the ground beneath, is projected by the lens upon that portion 16 of the film 13 lying on the pressure plate 14.

Preferably formed in or directly associated with the camera housing 10 is a chamber 17, between the opposite walls 18 and 19 of which is mounted the gimbal support 20 of a small vertical axis gyroscope 21 in the manner illustrated in Figures 1 and 2. Gyroscope 21 may be either of the electrically-driven or air-sustained rotor type, depending upon circumstances and requirements. While a gyroscope is preferred, it is to be understood that other stable elements, such as a pendulum, may be used with equal facility.

Secured to the upper part of the casing of gyroscope 21 for relative movement therewith, is a frame 22 carrying a screen 23 having an aperture 24 whose geometrical center lies exactly in the vertical axis of the gyroscope 21. The aperture 24 may be of any desired shape, such as the cross illustrated in Figure 2, which is a section as seen along the line 2—2 of Figure 1. The screen 23, or reticule formed thereby, is convex and its center of curvature is at the mean axis of tilt of the gyroscope 21.

Positioned behind the reticule or screen 23 is a suitable source of light such as a small incandescent lamp 25 mounted on a bracket 26, or, alternatively, carried by the gyroscope 21 casing or frame 22. Lamp 25 is energized when switch 27 is closed, and the switch is preferably actuated by or simultaneously with the camera shutter tripping mechanism, so that the lamp is illuminated only when the film 16 is exposed.

Mounted over the reticule or screen 23 on the frame of the camera for movement therewith is a transparent or translucent scale 28, illustrated in detail in Figure 3, and so positioned that its center lies exactly on the vertical axis of the gyroscope 21 when the camera is level, so that the center of the aperture 24 of screen 23 and the center of the scale 28 coincide as is indicated in Figure 3. The scale 28 is calibrated at 29 in degrees of tilt in coordinate vertical planes coincident with the vertical planes of the arms of the reticule cross 24, so that the position of the reticule cross 24 indicates the angle as well as the direction of tilt of the camera. The scale is also subdivided into squares 30 about the center point for aiding in measuring tilt in directions other than along the planes of the graduations 29.

The curvature of the scale 28 conforms to that of reticule or screen 23, and where the latter is opaque, the scale 28 is spaced slightly therefrom so as to be sufficiently illuminated that its image is clear from above. Where the reticule or screen 23 is translucent, it may be more closely positioned to scale 28. The arrangement must be such that when viewed from above, both the scale 28 inscriptions and the reticule cross 24 must be clearly outlined and sharply identifiable for accurate reading. Alternatively the screen 23 may be transparent or translucent and the cross 24 may be opaque, providing a sharp outline of the latter on the scale 28.

The beam of light issuing from the reticule or screen aperture 24 and passing through scale 28 is reflected by 45° plane reflector 31 laterally through fixed lens 32 upon another 45° plane reflector 33 which in turn reflects it upon a portion of the film 16 lying outside of the field of view of the camera, being screened therefrom by wall 34. The image of the scale 28, with the reticule cross 24 superimposed thereon, is accordingly photographed on the film adjacent to the picture and becomes a part of the negative, as is indicated at 35 in Figure 4. By means of record 35, the degree of tilt of the camera at the instant of exposure is indicated on the negative itself and correction for tilt can be immediately and accurately made.

In the arrangement of Figure 5, the tilt indicating apparatus is mounted on an instrument, such as the camera 10, and the degree of tilt is observed directly on the scale 28, the gyroscope 21 carrying the reticule or apertured screen 23 as before, but the lamp 25 is provided with a lens 36 for directing parallel rays through the reticule upon the under side of the scale 28, the image of the reticule being visible through the transparent or translucent scale 28 in the manner described.

In Figure 6 there is shown a combination of the arrangements of Figures 1 and 5, in that the degree of tilt is both recorded on the film of the camera 10 in the manner described and is directly indicated in the view finder telescope 37 mounted on the camera 10. The tilt record is photographed on the film 13 by means of the stabilized optical system, including the gyroscope 21, lamp 25, reticule or apertured screen 23, scale 28, reflector 31, lens 32 and reflector 33, as described in connection with Figure 1. At the same time the observer may level the camera before exposure by reference to the tilt indication in the view finder 37, which is provided by a duplicate stabilized optical system. This system is connected to the lower end of the casing of gyroscope 21 and includes a reticule or apertured screen 23' carried by the gyroscope 21 and identical to screen 23, the fixed scale 28' identical to scale 28, reflector 31', lens 32' and half-silvered reflector mirror 38 in the field of view of the telescope 37. The image of the scale 28' with super-imposed screen 23' aperture is clearly visible on reflector 38 without obstructing the view of the telescope 37, since the reflector 38 is largely transparent. Instead of being energized only when an exposure is made as in the case of lamp 25, the lamp 25' is constantly illuminated so that observation of the degree of tilt may be made at any time, such as before a picture is taken.

In the arrangement of Figure 7, the tilt recording apparatus is separate from the camera, being an auxiliary unit 40 attached to the housing of the main camera 10, and having its own film 41 on which is recorded the tilt indication. The stabilized optical system, including the lamp 25, energized simultaneously with the camera shutter, the reticule or apertured screen 23 and the scale 28, is the same as in Figure 1, and with it the image of the scale 28 with superimposed reticule is formed on the auxiliary film 41 by lens 42. The auxiliary recording film 41 is advanced at the same time and at the same relative rate as the main camera film 13, the reel 43 of the recording film 41 being driven by connections 44 from within the camera 10 by the mechanism which advances the main film 13. The corresponding length of auxiliary film 41 and main film 13 bear like cross-reference characters or numerals 45 so that each exposure of the main film 13 may be checked for tilt by reference to the corresponding length of recording film 41.

In the arrangement of Figure 8, which is a modification of the auxiliary recording mechanism of Figure 7, the gyroscope 21 is not fitted with the screen or reticule, but merely with a center reflector 46 under a lens 47, while the lamp 48, provided with a hood 49, directs a beam of light upon a 45° half-silvered reflector 50, which reflects the light into the mirror 46 for direction by the lens upon the auxiliary record film 41' positioned in the focal plane of the lens 47. The record film 41' is provided with longitudinal parallel graduations 51 at either side of the center line 52 representing the degree of tilt of the instrument in one plane, i. e., when the instrument is level, the image of the light spot from lens 47 falls on the center line. Cross graduations 53 indicate the degree of tilt of the instrument in the other plane.

It will be seen that the apparatus of this invention provides a very simple but effective means for indicating, or registering a permanent record of the degree of tilt of an observation instrument or the like at the time that an observation is made, and that the invention is peculiarly advantageous to aerial cameras although not limited to that use. It is also to be understood that, while certain preferred embodiments of the invention have been illustrated and described herein, the invention is not limited thereby, but is susceptible of change in form and detail within the scope of the appended claims. For example, the reticule or other indicator may be fixed on the camera and the scale connected to the gyroscope, and an auxiliary film may be associated with an observation instrument other than a camera, and the like.

The term "film" as used herein and in certain of the appended claims comprehends all forms of photo-sensitive films however applied, whether on a plate, flexible cellulose derivative strip, or the like.

We claim:

1. A device for indicating the tilt of an aerial camera and for recording the amount of tilt on a film, said device comprising, in combination, a stable element movably mounted on said camera, a view finder mounted on said camera, a plurality of members connected to said element and movable therewith, whereby said members remain in predetermined positions regardless of the attitude of the camera at the instant of exposure of said film, an optical system mounted on said camera and optically arranged relative to one of said members and to said film for projecting an image of said one member on said film at the instant of exposure so that the film when developed will include a record of the attitude of the camera at the instant of exposure, and an optical system mounted on said camera and optically arranged relative to another of said members and to said view finder for projecting an image of said other member within the field of view of said view finder so that the operator of the camera can determine the attitude thereof preliminary to taking an exposure.

2. A device for indicating the tilt of an aerial camera and for recording the amount of tilt on a film, said device comprising, in combination, a stable element movably mounted on said camera, a view finder mounted on said camera, a pair of tilt measuring members on said camera, a pair of apertured members on said camera, means adapted to connect said first pair of members to said camera and the other pair of said members to said stable element, whereby one member of each pair is movable relative to one member of the other pair, two sources of light in said camera, one light source being arranged adjacent one tilt measuring member and one apertured member, and the other light source being arranged adjacent the other tilt measuring member and apertured member, one light source, one tilt measuring member and one apertured member comprising a projecting unit whereby all of said members and light sources form two separate projecting units, and means including a view finder and an optical system mounted on said camera and optically arranged relative to one of said units and to said film for transmitting the projection from said last-mentioned unit of the image of one of the members in said last-mentioned unit within the field of view of said view finder so that the operator of the camera can determine the attitude thereof preliminary to making an exposure.

3. A device for indicating the tilt of an aerial camera and for recording the amount of tilt on a film, said device comprising, in combination, a stable element movably mounted on said camera, a view finder mounted on said camera, a pair of reticules connected to said element in alignment with the vertical axis thereof, whereby said reticules remain in predetermined positions regardless of the attitude of the camera at the instant of exposure of said film, a scale member connected to said camera closely adjacent each of said reticules whereby there is provided a reticule and a scale member on each side of the horizontal axis of said stable member, means for illuminating said reticules, an optical system mounted on said camera and operatively arranged relative to one of said scale members and to said film for projecting an image of at least a portion of said one scale member on said film at the instant of exposure so that the film when developed will include a record of the attitude of the camera at the instant of exposure, and another optical system mounted on said camera and arranged relative to the other of said scale members and to said view finder for projecting an image of at least a portion of said last-mentioned scale member within the field of vision of said view finder so that the operator of the camera can determine the attitude thereof preliminary to making an exposure.

4. An aerial camera comprising, in combination, a casing, a film compartment in said casing adapted to receive a roll of film or the like, means forming a chamber in said casing, a gyroscope mounted in said chamber for movement relative to said casing, tilt measuring means including a source of illumination and an optical system for projecting on said film an indication of the inclination of said casing relative to the attitude of said gyroscope at the time of exposure, a view finder connected to said casing and including an optical system, second tilt measuring means in said casing and including a source of illumination and an optical system for projecting an indication of the inclination of said casing with respect to the attitude of said gyroscope, said last-mentioned optical system being operatively associated with at least a portion of the optical system in said view finder whereby the operator of the camera can determine the attitude thereof preliminary to making an exposure.

FREDERICK W. LUTZ.
JOHN D. PEACE, Jr.